United States Patent [19]
Wanke et al.

[11] Patent Number: 4,536,488
[45] Date of Patent: Aug. 20, 1985

[54] METHOD OF MANUFACTURING A CRYSTALLINE SILICA/PLATINUM CATALYST STRUCTURE

[75] Inventors: Sieghard E. Wanke; Huseni A. Rangwala; Fred D. Otto; Ivo G. Dalla Lana, all of Edmonton; Linda M. Paterson, Petawawa; John H. Rolston, Deep River, all of Canada

[73] Assignee: Atomic Energy of Canada Limited, Ottawa, Canada

[21] Appl. No.: 620,572

[22] Filed: Jun. 14, 1984

[30] Foreign Application Priority Data

Oct. 24, 1983 [CA] Canada ................................. 439528

[51] Int. Cl.³ ..................... B01J 31/06; B01J 23/42; B01D 5/02
[52] U.S. Cl. ..................... 502/159; 502/62; 423/580; 423/648 R
[58] Field of Search ................ 502/159, 101; 423/580; 429/42

[56] References Cited

U.S. PATENT DOCUMENTS

| | | | |
|---|---|---|---|
| 2,690,379 | 9/1954 | Urey et al. ........................... | 502/182 |
| 3,888,974 | 6/1975 | Stevens ................................ | 502/159 |
| 3,981,976 | 9/1976 | Stevens ................................ | 502/159 |
| 4,025,560 | 5/1977 | Rolston et al. ..................... | 423/580 |
| 4,061,724 | 12/1977 | Grose et al. ........................ | 423/335 |
| 4,228,034 | 10/1980 | Buttler et al. ...................... | 423/580 |
| 4,374,907 | 2/1983 | Chuang et al. ..................... | 429/57 |
| 4,376,066 | 3/1983 | Bruggeman et al. ............... | 423/580 |
| 4,387,258 | 6/1983 | Vadekar et al. .................... | 502/62 |

*Primary Examiner*—P. E. Konopka
*Attorney, Agent, or Firm*—Francis W. Lemon

[57] ABSTRACT

A crystalline, silica platinum catalyst structure is provided by soaking a hydrophobic, high surface area, crystalline silica ($SiO_2$) lattice essentially free of aluminum oxide in the $SiO_2$ lattice, such as silicalite in an aqueous solution of $Pt(NH_3)_4 Cl_2$ and then, drying, reducing and cooling the crystalline silica to leave, catalyst crystallites of platinum on the crystalline silica and in the pores thereof, and then providing an outer, porous, membrane coating of high molecular weight, organic polytetrafluoroethylene, polymeric material on the coated crystallites. The platinized, crystalline silica may be slurried with, polytetrafluoroethylene and a ceramic support coated with the slurry, so that a water repellent, water vapor and hydrogen or oxygen gas permeable, polytetrafluoroethylene matrix is provided on the support with the platinized, crystalline silica dispersed in the matrix. The catalyst has a high platinum content and high platinum dispersion and is particularly useful for hydrogen isotope exchange between liquid water and gaseous hydrogen or for such exothermic reactions as combining hydrogen and oxygen.

4 Claims, No Drawings

METHOD OF MANUFACTURING A CRYSTALLINE SILICA/PLATINUM CATALYST STRUCTURE

This invention relates to a method of manufacturing crystalline, silica, platinum catalyst structure.

U.S. Pat. No. 2,690,379, dated 1954, H. C. Urey and A. V. Gross, discloses a process for the production of deuterium oxide, by bringing hydrogen containing deuterium and water together in a reaction chamber, and catalyzing the equilibrium reaction between them by means of a catalyst selected from or compounded from nickel, cobalt, iron, ruthenium, rhodiuim, palladium, osmium, iridium, platinum, molybdenum, tungsten, and rhenium on an inert support. This isotopic enrichment process is an example of the application of a chemical exchange reaction between two hydrogen-containing species for the separation of the isotopes of hydrogen which differ in their atomic mass. Using deuterium as an example, this chemical exchange reaction can be written in terms of the light isotope, protium (H), and the heaview isotope, deuterium (D), as:

$$HD \text{ gas} + H_2O \text{ liquid} \rightleftharpoons HDO \text{ liquid} + H_2O \text{ gas} \quad (1)$$

where the equilibrium constant $K_1$, is given in terms of the molar concentrations as:

$$K_1 = [HDO][H_2]/[HD][H_2O] \quad (2)$$

The degree of isotopic separation for the chemical exchange process between streams of hydrogen and liquid water can be characterized by the separation coefficient, $\alpha$, which is defined as the ratio of the atom fractions of the heavy to light isotopes in the water phase relative to those in the hydrogen gas.

$$\alpha = \frac{\left(\frac{D}{H}\right) H_2O \text{ liquid}}{\left(\frac{D}{H}\right) H_2 \text{ gas}} \quad (3)$$

The magnitude of the process separation coefficient, $\alpha$, is proportional to the equilibrium constant, $K_1$, of the chemical exchange reaction and varies with temperature, but as defined, is always greater than unity. Hence, under conditions of isotopic equilibrium between streams of liquid water and hydrogen gas, the deuterium concentration in the liquid water, $(D/H)H_2O$ liquid, is always greater than the deuterium concentration in the hydrogen gas, $(D/H)H_2$ gas. In a separation process in which streams of hydrogen and liquid water, carrying deuterium concentrations other than the equilibrium concentration, are brought into contact with one another, under conditions where distribution of the hydrogen isotopes can occur, there will be a net transfer of atoms of the heavy isotope from one phase to the other which is exactly offset by a net transfer of atoms of the light isotope in the opposite direction. The net transfer will tend to proceed until the ratio of the isotopic contents of the two streams reaches the equilibrium value given by equation (3). As isotopic equilibrium between the two streams is being established, the initial concentration of the heavier hydrogen isotope (deuterium) in one stream will be raised above its initial level to approach the new equilibrium value which is characteristic of the temperature and operating conditions of the process.

It is a desirable feature of any practical process involving transfer of hydrogen isotopes between streams of hydrogen and liquid water that the transfer proceed at the highest possible rate so that the equilibrium distribution of the isotopes be attained in the shortest possible time and also in the smallest volume. This is particularly important in a multistage or cascade process, such as described by M. Benedict and T. H. Pigford in Nuclear Chemical Engineering, McGraw-Hill, 1957, in which the streams of hydrogen and liquid water are required to flow substantially in opposite directions between stages, although not necessarily within each stage. In such a process, a stage can be defined as the unit volume through which streams of hydrogen and liquid water pass and in which the approach to the equilibrium isotope distribution can be measured or calculated in some reasonable manner.

The most economical and efficient way to accomplish a hydrogen isotope exchange between the two streams is to keep the bulk of the water continuously in the liquid state and to flow this saturated with dissolved hydrogen downwardly, through a packed catalyst bed, in the opposite direction to the flow of gaseous hydrogen, saturated with water vapour.

One major problem with the process disclosed in the above United States patent is that, while catalysts have been found to catalyze the hydrogen isotope exchange between hydrogen and water vapour, these same catalysts show a large and undersirable loss of activity when brought into intimate contact with liquid water. The intimate contacting of the liquid water with the catalytically active metal results in isolating the catalytically active metal from the hydrogen gas. This drastically limits the rate of the exchange since only hydrogen dissolved in the liquid is then readily available for isotopic exchange. In the presence of liquid water the resulting activity is too low for the process to be economical and so in the plant described in "Production of Heavy Water", by M. Murphy, H. C. Urey and I. Kirshenbaum, McGraw-Hill Book Co., N.Y., 1955, p. 14, contact of liquid water with the catalyst was prevented by physically separating the catalyst from the stream of liquid water and by maintaining the relative humidity of the process stream below the saturation level while in contact with the catalyst. Such a process, while operable in a satisfactory manner, is expensive, and so it would be desirable to prevent the deactivation of the catalytically active metal by contact with liquid water and provide a hydrogen isotope exchange process between streams of gaseous hydrogen and liquid water wherein the catalyst assembly need not be physically separated from the stream of liquid water.

U.S. Pat. No. 3,888,974, dated June 10, 1975, by W. H. Stevens, is directed to the problem of providing a bithermal process for hydrogen isotope exchange between gaseous hydrogen and liquid water using catalytically active metal and wherein deactivation of the catalytically active metal by liquid water is retarded. This Stevens' process uses a catalyst provided with a substantially liquid-water-repellent organic resin or polymer coating, which is permeable to water vapour and hydrogen gas, and the overall catalytic exchange of isotopes between streams of hydrogen and liquid water primarily occurs by a two-step exchange process with the following simultaneous reactions being closely coupled in space, Step 1

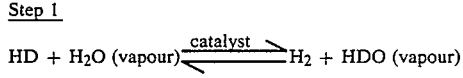

Step 2

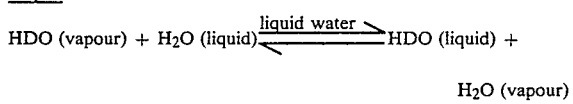

$H_2O$ (vapour)

While the process of the Stevens' patent is undoubtedly a great improvement in retarding the deactivation of the catalytically active metal by contact with the liquid water stream, there remains a need to further retard the deactivation of the catalytically active metal by contact with liquid water and at the same time to increase the rate of hydrogen isotope exchange and thus provide a more economical process.

U.S. Pat. No. 4,025,560, dated May 24, 1977, J. H. Rolston, W. H. Stevens, J. P. Butler and J. den Hartog, discloses a similar process to that described in the Stevens' patent but wherein deactivation of the catalytically active metal is retarded while at the same time a greater rate of hydrogen isotope exchange is achieved. In this Rolston et al process at least one water repellent catalyst assembly is used having a metallic catalyst consisting of at least one Group VIII metal, deposited in the pores of a porous, inherently hydrophobic support. The porous, inherently hydrophobic support acts as a casing for the catalytically active metal and substantially prevents the catalyst from being contacted by the liquid water stream while allowing hydrogen gas and water vapour to rapidly contact the catalyst, whereby even though streams of liquid water and hydrogen gas are brought into contact with each other in the presence of the catalyst assembly, the exchange occurs primarily by the two steps mentioned above in the Stevens' patent but with a slower rate of deactivation of the catalytically active metal.

U.S. Pat. No. 4,228,034, dated Oct. 14, 1980, J. P. Butler, J. H. Rolston, J. den Hartog, F. W. R. Molson and J. W. Goodale, discloses a water repellent catalytically active mass for use in the process described in the Stevens' patent wherein exposed, partially platinized high surface area carbon particles are dispersed throughout the whole of a porous matrix of polytetrafluoroethylene in the weight ratio 1:1 to 3:1 of polytetrafluoroethylene to partially platinized high surface area carbon particles. This particular catalytically active mass gives a rapid overall isotopic exchange between hydrogen and liquid water without a pronounced loss of activity of the catalytically active mass.

While the processes described in the Stevens' and Rolston et al patents, and the catalytically active mass described in the Butler et al patent, are undoubtedly useful there is a need for a water repellent catalytically active mass of this type having a highly dispersed and active catalyst crystallites of the catalytically active metal on a support which is not combustible as is the case with high surface area carbon particles. Such a catalytically active mass would be particularly useful for catalyzing exothermic reactions because using the catalytically active mass described in the Butler et al patent could lead to combustion of the high surface area carbon particles which in turn could lead to combustion of the polytetrafluoroethylene. Put another way, there is a need for a catalytically active mass of the type described in the Butler et al patent wherein, when used in exothermic reactions, the polytetrafluoroethylene is only subjected to the exothermic heat and is not, in addition, subjected to heat degradation of any particulate substance carrying the catalytically active metal.

It has also been proposed in U.S. patent application Ser. No. 298,301, filed Sept. 1, 1981, K. T. Chuang, M. F. Roett and F. W. Lemon, to provide a gaseous hydrogen and oxygen combining and condensing device wherein a catalyst is provided beneath a condensing chamber containing a catalytically active mass comprising a porous matrix of polytetrafluoroethylene and exposed, partially platinized high surface area carbon particles dispersed throughout the porous matrix. In this device, the combined hydrogen and oxygen is condensed and passes through the catalyst chamber as a coolant to dissipate exothermic heat generated at the catalytically active mass.

While the combining device of Chuang et al is useful, there is a need for a catalyst structure for such exothermic reactions in oxidizing atmospheres wherein the catalytically active metal is dispersed as crystallites on a porous, inorganic material which is not combustible.

While such a catalytically active mass would be particularly useful for exothermic reactions, its water repellent properties would also make it useful in other areas such as, for example, hydrogen isotope exchange between gaseous hydrogen and liquid water. Such hydrogen isotope exchange could be used for the production of heavy water or for the removal of radioactive hydrogen isotopes from contaminated light or heavy water.

More recently, it has been proposed in U.S. Pat. No. 4,387,258, dated June 7, 1983, M. Vadekar and H. E. Robson, to selectively hydrogenate a hydrocarbon feed to convert alkynes and dienes to alkenes containing a single olefinic double bond by contacting the feed with hydrogen over a catalyst comprising palladium or platinum supported on a crystalline silica polymorph. Such a catalyst is not required to be, and is not, water repellent and so cannot be used in processes where it is necessary for a catalytically active mass to be brought into contact with liquid water.

According to the present invention there is provided a method of manufacturing a crystalline silica/platinum catalyst structure comprising:

(a) soaking a hydrophobic, porous, high surface area, crystalline silica ($SiO_2$) lattice essentially free of aluminum in the $SiO_2$ lattice, in an aqueous solution of $Pt(NH_3)_4Cl_2$, the crystalline silica being a silica polymorph consisting of crystalline silica which, after calcination in air at 600° C. for one hour, has a mean refractive index of $1.39 \pm 0.01$ and a specific gravity at 25° C. of $1.70 \pm 0.05$ g/cc, then (b) drying the soaked, hydrophobic, porous, high surface area, crystalline silica to leave catalyst crystallites of platinum from the aqueous solution of $Pt(NH_3)_4Cl_2$ on the crystalline silica and in the pores thereof, then (c) reducing the catalyst crystallites by heating them in an atmosphere of hydrogen gas, then (d) cooling the crystallites to room temperature in an inert atmosphere, then (e) coating the crystalline silica, with the catalyst crystallites thereon and in the pores thereof, with high molecular weight, organic, polytetrafluoroethylene polymeric material to provide an outer, porous membrane coating thereon which is inherently hydrophobic, to substantially inhibit the passage of water therethrough, and which is water vapour and gas permeable so that water vapour and gas may pass therethrough.

A volatile amine, preferably ammonia or methylamine, may be added to the aqueous solution to bring the pH thereof to at least 9.5, and preferably in the range 10.5 to 11.0, while the crystalline silica is soaked therein.

Preferably the crystalline silica, with the catalyst crystallites on and in the pores thereof, is slurried with a fluid suspension of the high molecular weight, organic, polymeric material, a porous support is coated with the slurry, and then the slurry coating is dried to leave a coating on the support comprising the crystalline silica, with the catalyst crystallites thereon and in the pores thereof, and coated with the high molecular weight, organic, polymeric material.

Embodiments of the present invention will now be described, by way of example, wherein catalytically active platinum crystallites are deposited on, and in the pores of, crystalline silica of the type disclosed in U.S. Pat. No. 4,061,724, dated Dec. 6, 1977, by R. W. Grose and E. M. Flanigen, and marketed under the trademark "S-115 silicalite" by Union Carbide Corporation, New York, N.Y., U.S.A.

Procedures for the preparation of platinum (Pt) crystallites on silicalite, and the preparation of polytetrafluoroethylene wetproofed catalysts are given, and the properties of these catalyst structures (i.e. platinum dispersion and catalytic activity) are compared with those of platinum crystallites on other materials.

PREPARATION OF PT ON SILICATE CATALYSTS

PROCEDURE A: Impregnation of silicalite with hexachloroplatinic acid (Catalyst A)

Silicalite powder (1.9 g) was added to 25 cm$^3$ of acetone solution containing 0.74 of hexachloroplatinic acid. The excess solvent was removed by evaporation using a rotary evaporator at 60° C. and the powder cake was broken up and transferred to a heated cabinet at 100° C. for further drying over 2 hours. The free flowing powder was reduced under a stream of hydrogen gas (1 cm$^3 \cdot$min$^{-1}$) at 200° C. over 3 hours in a 2 cm diameter tube furnace and allowed to cool under a helium atmosphere to room temperature.

Comparison of Activity of Pt/silicalite with Activities of Pt on Other Supports

The effectiveness of silicalite as a support can be determined by comparing the rates of isotopic exchange between hydrogen gas and water vapour for Pt/silicalite to those of Pt on other supports. In order for these comparisons to be meaningful, the exchange rates are expressed per unit area of Pt. Platinum surface areas of Catalyst A as well as those of Pt on other supports (Catalysts B to F) were measured by hydrogen chemisorption at room temperature. In order to convert hydrogen adsorption uptakes to Pt surface areas, it was assumed that one hydrogen atom adsorbs per surface Pt atom [i.e. Pt dispersion=(hydrogen atoms adsorbed)/(Pt metal atoms)], and that the area per surface Pt atom is equal to 0.0835 nm$^2$.

The exchange rates between hydrogen gas and water vapour were measured in a single pass flow reactor operating at 35° C. with a relative humdity of 55% of saturation. Under these conditions liquid water was not in contact with the platinized powders and it was possible to observe the intrinsic rates of the exchange reaction. The platinized catalyst powders were supported on a glass frit in a glass tube and hydrogen containing isotopically enriched water vapour was passed downward through the catalyst bed. The rate of isotopic exchange of the deuterium tracer, k$_R$ (moles/s g of catalyst), present in the water vapour was calculated from the expression:

$$k_R = \frac{1}{\frac{1}{K} + \frac{1}{\pi}} \cdot \frac{F}{W} \cdot \log_e \frac{y^* - y_B}{y^* - y_T} \qquad (1)$$

where
F is the flow of hydrogen (moles/s)
W is the weight of the catalyst powder (g)
$\pi$ is the partial pressure ratio of water vapour to hydrogen
K is the equilibrium constant for the isotopic exchange reaction HD (gas)+H$_2$O (vapour)⇌HDO (vapour)+H$_2$ (gas)
y is the atom fraction of deuterium in the hydrogen gas at the bottom (B) and top (T) of the catalyst bed, and
y* is the equilibrium atom fraction in the hydrogen gas for the specified humidity.

The results of activity and Pt surface area measurements for the various supported Pt catalysts are summarized in the following Table 1.

It will be seen from Table 1 that the rate of the Pt/silicalite (Catalyst A) per unit area was comparable to that of the best conventional exchange catalysts, i.e. Pt/carbon and Pt/Teflon. However, the exchange rate for Catalyst A per gram of catalyst was significantly lower than that of the Pt/carbon (Catalyst B). This was due to the relatively low Pt dispersion of Catalyst A, and so procedures for preparing Pt/silicalite catalysts with higher Pt dispersions were developed.

PROCEDURE B: Ion exchange of silicalite with Pt(NH$_3$)$_4$Cl$_2$

PROCEDURE B-1: Without addition of ammonia (Catalysts G, H, I)

Several samples of Pt on silicalite were prepared by immersing 3.0 g of silicalite in aqueous solutions of Pt(NH$_3$)$_4$Cl$_2$ having a Pt concentration of about 12 mg Pt/cm$^3$ of solution. The amount of solution in the preparation was varied from about 25 to 100 cm$^3$ of solution per gram of silicalite.

The silicalite-Pt solutions were allowed to equilibrate at room temperature for at least 60 h with intermittent shaking. After equilibration, the solution was filtered and the retained solids were washed 8 to 10 times with deionized water. A total of at least 150 cc of water per gram of silicalite was used in these washings. The filtered catalysts were dried and activated according to the procedure described in the following Table 2.

The Pt content of these preparations was determined by neutron activation and Pt dispersions and surface areas were determined by hydrogen chemisorption. The results of these measurements are tabulated in the following Table 3.

This preparation technique resulted in improved Pt dispersions, but the total Pt loadings were only 0.6 to 0.9 wt %.

PROCEDURE B-2: Addition of $NH_3$ to Pt $(NH_3)_4Cl_2$ Solution

Procedure B-2 is similar to Procedure B-1, except that sufficient ammonia was added to the starting $Pt(NH_3)_4Cl_2$ solution so that the pH was nominally 10.5. Without ammonia addition, the pH of the aqueous $Pt(NH_3)_4Cl_2$ solution was about 4. The equilibration, washing and activation for Procedure B-2 was identical to that described for Procedure B-1. Procedure B-2 resulted in Pt/silicalite catalysts with relatively high Pt loadings and excellent Pt dispersions. Results for various Pt/silicalite catalysts prepared by Procedure B-2 with differing amounts of starting solution per gram of silicalite, are shown in Table 3 (Catalysts J to O). The Pt/silicalite catalyst appeared to be an excellent candidate for the hydrogen isotope exchange reaction between hydrogen gas and liquid water. The wetproofing of the Pt/silicalite for the hydrogen gas-liquid water, hydrogen isotope exchange studies is described below.

TABLE 1

Comparison of Pt Surface areas and activities for isotopic exchange between hydrogen gas and water vapor for Pt on various supports (Catalyst prepared by impregnation, i.e., Procedure A)

| Catalyst | Support Material | Nominal Pt Loading (wt %) | Platinum Dispersion (H/Pt) | Platinum Area ($\frac{m^2}{g\ cat}$) | Exchange Rates*, $k_R$ ($\frac{mol}{s.g\ cat}$) $\times 10^3$ | ($\frac{mol}{s.m^2\ Pt}$) $\times 10^4$ |
|---|---|---|---|---|---|---|
| A | Silicalite | 12 | 0.08 | 2.5 | 2.3 | 9.2 |
| B | Carbon | 10 | 0.38 | 9.7 | 10.7 | 11.0 |
| C | Teflon** | 12 | 0.05 | 1.7 | 1.4 | 8.2 |
| D | Silica Gel | 10 | 0.16 | 4.0 | 1.2 | 3.4 |
| E | Alumina | 10 | 0.21 | 5.5 | 0.8 | 1.4 |
| F | Linde 5A Molecular Sieve | 12 | 0.16 | 4.8 | 0.2 | 0.5 |

*Exchange rates for hydrogen flow rates (F) above $5 \times 10^{-3}$ mol/s (~110 cm$^3$ (STP)/s). Exchange rates are essentially constant for G greater than $5 \times 10^{-3}$ mol/s.
**Trademark

TABLE 2

Activation procedure for Pt/Silicalite catalysts prepared by Procedures B-1 and B-2

| Operation | Temperature (°C.) | Pressure (kPa) | Time (h) |
|---|---|---|---|
| 1. Drying | 60 | 93[a] | 2 |
|  | 120 | 93 | 5 |
| 2. Calcination in air | 300 | 93 | 3 |
| 3. Calcination in oxygen | 300 | 93 | 4 |
| 4. Evacuation | 300 | ≦0.1 | 20 |
| 5. Reduction in hydrogen | 300 | 25 to 30 | 36 |
| 6. Evacuation | 300 | ≦0.1 | 6 |

[a]93 kPa corresponds to atmospheric pressure in Edmonton

TABLE 3

Platinum loadings, dispersion and areas for Pt/Silicalite catalysts prepared by Procedures B-1 and B-2

| Catalyst | Preparation Procedure | Amount of Solution[a] (cm$^3$/g silicalite) | Platinum Loading[b] (wt %) | Platinum Dispersion (H/M) | Platinum Area (m$^2$/g of catalyst) | Vapor Phase Exhange Rate ($\times 10^3$) (mol(HD)·g$^{-1}$·s$^{-1}$) | Specific Exchange Rate ($\times 10^4$) (mol(HD)·m$^{-2}$·s$^{-1}$) |
|---|---|---|---|---|---|---|---|
| G | B-1 | 25 | 0.60 | 0.44 | 0.73 |  |  |
| H | B-1 | 53 | 0.66 | 0.68 | 1.23 | 0.49 | 0.40 |
| I | B-1 | 97 | 0.88 | 0.51 | 1.24 |  |  |
| J | B-2 | 12 | 5.9 | 0.95 | 15.4 | 3.28 | 2.13 |
| K | B-2 | 25 | 6.3 | 1.1 | 19.1 | 4.22 | 2.21 |
| L | B-2 | 38 | 6.2 | 0.97 | 16.8 | 2.32 | 1.38 |
| M | B-2 | 53 | 7.2 | 1.0 | 19.9 | 4.10 | 2.06 |
| N | B-2 | 73 | 7.3 | 0.93 | 18.7 | 3.80 | 2.03 |
| O | B-2 | 97 | 7.4 | 0.95 | 19.3 | — | — |

[a]amount of $Pt(NH_3)_4\ Cl_2$ solution (12 mg Pt/cm$^3$ of solution) per gram of Silicalite
[b]Pt content determined by neutron activation Tests were also carried out adjusting the pH of the starting solution to values in the range 9.0 to 11.3. These tests showed that a sufficient uptake of platinum by the silicalite is obtained with a pH of at least 9.0. The preferred pH of the solution was found to be of the order of 10.5.

PROCEDURE B-3: Effect of Adjusting pH of $Pt(NH_3)_4Cl_2$ Solutions

Procedure B-3 was similar to B-2 except that the quantity of aqueous ammonia added to each of 5 starting $Pt(NH_3)_4Cl_2$ solutions was adjusted to maintain the pH of each solution, containing the silicalite and platinum salt, at different levels. For the solutions at highest pH, it was necessary to add additional $Pt(NH_3)_4Cl_2$ salt to compensate for the volume of ammonia added and maintain the initial $Pt(NH_3)_4Cl_2$ concentration of 0.02 g·ml$^{-1}$. The results of catalyst preparations (S to W), each using 3 grams of silicalite with 35 ml of solution are summarized in Table 4. The total volume of concentrated ammonia and weight of platinum salt added over the 60 hour equilibration are shown for each catalyst.

The washing and activation procedure was as described for Procedure B-1.

This study confirmed that the solution pH has a significant effect on both the platinum loading and the metal area that is catalytically active. The results show that the preferred solution pH clearly is greater than 9.5 and is preferably in the range 10.5 to 11.0. Lower Pt loadings and metal dispersions were obtained with solutions of lower and higher pH although these results did not indicate an upper limit of the solution pH.

Comparison of Activity for Pt/Silicalite and Pt/carbon Wetproofed Catalysts for Isotopic Exchange Between Hydrogen and Liquid Water The activities of wetproofed catalysts, prepared by Procedures C-1 and C-2, for the isotopic exchange between hydrogen and liquid water were measured in trickle bed reactors having inside diameters of 2.64 cm. Wetproofed catalyst spheres were diluted with an equal number of non-catalytic ceramic spheres and this mix-

TABLE 4

Effect of pH Control on Platinum Loadingm, Dispersion and Metal Areas for Pt/silicalite catalysts prepared by Procedure B-3.

| CATALYST | Final Volume[a] of Solution ($cm^3$) | Average pH of Solution[b] over 60 h | Amount of $Pt(NH_3)_4Cl_2$ Added (g) | Platinum[c] Loading (wt %) | Platinum[d] Dispersion (H/M) | Vapour Phase[e] Exchange Rate ($\times 10^3$) $(mol(HD) \cdot s^{-1} \cdot g^{-1})$ | Specific Exchange Rate ($\times 10^4$) $mol(HD) \cdot m^{-2} \cdot s^{-1}$ |
|---|---|---|---|---|---|---|---|
| S | 35.5 | 9.5 | .746 | 4.1 | .66 | 3.40 | 4.84 |
| T | 38.5 | 10.5 | .752 | 5.7 | — | 7.4 | — |
| U | 38.3 | 10.5 | .751 | 5.7 | .86 | 5.83 | 4.61 |
| V | 45.9 | 11.0 | .920 | 6.5 | .80 | 6.35 | 4.78 |
| W | 56.9 | 11.3 | 1.140 | 6.2 | .65 | 6.43 | 5.98 |

[a]Volume in excess of 35.0 ml represents volume of concentrated aqueous ammonia added to maintain pH with an average concentration of $Pt(NH_3)_4Cl_2$ equal to 0.02 $g \cdot ml^{-1}$
[b]Measured with glass electrode calibrated against standard buffer solutions.
[c]Pt content determined by neutron activation.
[d]Measured by hydrogen chemisorption at 25° C. following reduction and outgassing of catalysts at 200° C.
[e]Exchange results for hydrogen flow rates (F) above 110 $cm^3$ (STP) $\cdot s^{-1}$

PREPARATION OF WETPROOFED PT/SILICALITE CATALYSTS

PROCEDURE C-1: Wetproofing of Pt/silicalite catalysts prepared by Procedure B-2

A 4.7 g sample of Pt/silicalite prepared by procedure B-2 was added to 21 $cm^3$ of Teflon-60 diluted with 35 $cm^3$ of distilled water. The mixture was dispersed in an ultrasonic bath and 1.7 $cm^3$ of 5% Triton-X100 solution was added to stabilize the dispersion. Rough ceramic spheres, obtained from Norton Corp., Tallmadge, Ohio, U.S.A., were precoated with Teflon. Seventy grams of these precoated spheres were coated with the above dispersion by soaking the spheres for 10 min. and then drying the wet spheres in air at 150° C. for 1 h. This soaking-drying procedure was repeated 3 times, resulting in a total weight increase of 7.8 g. The dried Pt/silicalite-Teflon coated spheres were cured in a muffle furnace at 300° C. for 15 min. The resulting Pt-silicalite-Teflon-ceramic spheres had a Pt content of 0.13 wt % as measured by neutron activation.

PROCEDURE C-2: Wetproofing of Pt/silicalite catalysts prrepared by Procedure A.

A 10 g sample of Pt/silicalite prepared by Procedure A was added to 50 g of an aqueous dispersion (60% solids) of Teflon 30 obtained from E. I. DuPont de Nemours & Co., diluted with 20 $cm^3$ of water. This dispersion was deposited on 19 g of rough ceramic spheres (similar to those used in Procedure C-1), by repeatedly immersing the spheres in the dispersion, draining off the excess through a wire basket and allowing the solvent to evaporate in a warm air stream. Between 80 to 90% of the platinized silicalite-Teflon mixture was deposited on the spheres with a ratio of platinized-silicalite to Teflon of 1 to 3.

The coated spheres were then dried at 100° C. for 30 minutes and heated at 370° C. for 15 minutes in a muffle furnace to bind the thin layer of the platinized-silicalite-Teflon mixture to the ceramic spheres.

ture was loaded into the reactors so that the total bed heights were between about 20 and 25 cm. Liquid water, containing the natural abundance of deuterium, was fed to the reactor at rates of 0.8 to 0.9 g/s. Hydrogen gas, enriched with deuterium was fed to the bottom of the reactor. The trickle bed reactors were operated at atmospheric pressure and room temperature.

As the hydrogen and water streams pass through the catalyst bed in countercurrent flow, deuterium was removed from the hydrogen stream and transferred to the liquid water. An equal amount of protium was transferred from the liquid water to the hydrogen to maintain the mass balance. Measurement of the deuterium content of the hydrogen exiting from the top of the column permits calculation of the overall exchange coefficient, $K_ya$ in the units of $m^3$ (STP)/s·$m^2$ (bed) from the following formula $$K_ya = \frac{F}{h \cdot A} \cdot NTU \qquad (2)$$

where
F is the hydrogen gas flow in $m^3$ (STP) per second,
h is the height of the catalyst column (m),
A is the cross-sectional area of the catalyst column ($m^2$) and,
NTU are the Number of Transfer Units in the column.

The latter are evaluated from the integral over the column, i.e.

$$NTU = \int_{y_T}^{y_B} \frac{dy}{y - y^*} \qquad (3)$$

where
y is the deuterium atom fraction in the hydrogen gas,
$y_T$ and $y_B$ are the values of y at the top and bottom of the catalyst bed, respectively, y* is the deuterium atom fraction in the hydrogen gas at equilibrium with the liquid having a deuterium atom fraction of x*.

A deuterium balance between gas and liquid streams yields:

$$NTU = \frac{1}{(1-J)} \log_e \left[ (1-J) \cdot \frac{y_B - y_T^*}{y_T - y_T^*} + J \right] \quad (4)$$

where
$J = G/\alpha \cdot L$
$G$ = molar flow of hydrogen stream, (mol/s)
$L$ = molar flow of liquid water stream, (mol/s)

$$\alpha = \text{equilibrium isotopic separtion factor} = \frac{x^*(1-y^*)}{y^*(1-x^*)}$$

Combining equations 2 and 4 allows the calculation of $K_y a$ for each run. The value of $K_y a$ is a valid estimate of the ability of a catalyst to perform the hydrogen isotope exchange between hydrogen gas and liquid water.

The results of $K_y a$ determinations for various catalysts are summarized in the following Table 5.

Results for wetproofed Pt/carbon catalysts are included in Table 5, because these are the best, currently available catalysts for the isotopic exchange between hydrogen gas and liquid water. The results in Table 5 show that wetproofed Pt/silicalite catalysts, according to the present invention, are comparable in overall performance to the best, conventional wetproofed Pt/carbon catalyst. In addition, Pt/silicalite catalysts, according to the present invention, have the advantage of an inorganic non-combustible support, compared to Pt/carbon, and so are more suitable for reactions in oxidizing atmospheres such as hydrogen-oxygen recombination reactions.

In other embodiments of the present invention, the hydrophobic, porous, high surface area, crystalline silica is that marketed under the trade name ZSM5 zeolite by Mobil Chemical Co., New York, N.Y., U.S.A.

Comparison of Activity of Wetproofed Catalyst Spheres for the Recombination of Hydrogen and Oxygen The rate of recombination of oxygen (1 mol %) with hydrogen was measured in a trickle bed reactor at 25° C. over wetproofed platinized silicalite catalysts prepared according to Procedures C-1 and C-2. Test columns (5.4 cm² in cross section by 20.5 cm length) of catalyst spheres diluted with an equal number of non-catalytic ceramic spheres of the same diameter were prepared. Liquid water was fed downward (0.8 g·s⁻¹) through the column and hydrogen gas containing 1.1 mol % $O_2$ was humidified and fed upwards through the catalyst bed. Oxygen concentrations through the bed were monitored by mass spectrometry.

TABLE 5

Comparison of activity for various wetproofed catalysts for the isotopic exchange between hydrogen gas and liquid water

| Catalyst | Size of Pellets (mm) | Platinum Support | Platinum Loading[a] (wt %) | $K_y a$[b] $\left[\frac{cm^3(STP)}{s \cdot cm^3(bed)}\right]$ | $\left[\frac{cm^3(STP)}{s \cdot g \text{ of Pt}}\right] \times 10^{-3}$ |
|---|---|---|---|---|---|
| P | 4.6 | Silicalite[c] | 0.13 | 1.12 | 1.47 |
| Q | 4.6 | Carbon | 0.15 | 1.22 | 1.45 |
| R | 6.1 | Carbon | 0.26 | 0.81 | 0.60 |

[a]Pt content of wetproofed catalysts was determined by neutron activation
[b]$K_y a$ values for hydrogen flow, G, above were $1.2 \times 10^{-2}$ mol/s (>350 cm³ (STP)/s). The values of $K_y a$ are independent of G at these values of G.
[c]Pt/silicalite was prepared according to Procedure B-2.
$K_y a$ values in Table 5 were determined as follows:
Catalyst P $$K_y a = \frac{1.12 \text{ cm}^3 \text{ (STP)} \cdot s^{-1} \cdot cm^{-3} \text{ bed}}{0.587 \text{ g cat} \cdot cm^{-3} \text{ bed} \times 0.0013 \text{ g Pt} \cdot g^{-1} \text{ cat.}}$$
$= 1470 \text{ cm}^3(STP) \cdot s^{-1} \cdot (g \text{ Pt})^{-1}$
$= 1.47 \text{ m}^3 (STP) \cdot s^{-1} \cdot (kg \text{ Pt})^{-1}$
Catalyst Q
$K_y a = 1450 \text{ cm}^3 (STP) \cdot s^{-1} \cdot (g \text{ Pt})^{-1}$
$= 1.45 \text{ m}^3 (STP) \cdot s^{-1} \cdot (kg \text{ Pt})^{-1}$
and Bed Density = 0.560 g cat · cm⁻³ bed
Catalyst R
$K_y a = 600 \text{ cm}^3 (STP) \cdot s^{-1} \cdot (g \text{ Pt})^{-1}$
and Bed Density = 0.555 g cat · cm⁻³ bed The first order rate constant, $k_1$, for $O_2$ recombination was calculated from the expression for a steady-state plug-flow reactor as given below and described in "Chemical Reaction Engineering" by O. Levenspiel, John Wiley and Sons, Inc., 1962.

$$k_1 = \frac{F_{Ao}}{V C_{Ao}} \cdot \log \frac{1}{1 - X_A}$$

The molar flow of oxygen (mol·s⁻¹) at the inlet (o) of the catalyst bed is given by $F_{Ao}$, V is the volume of the reactor (cm³), $C_{Ao}$ is the inlet oxygen concentration (mol·cm⁻³) and $X_A$ is the fractional conversion of oxygen defined as the ratio $(F_{Ao} - F_A)/F_{Ao}$.

The following Table 6 compares the first order rate constant for $O_2$ recombination over the silicalite catalyst with those obtained from a platinized carbon supported catalyst prepared which is representative of the currently available catalysts for recombination. The results show that the wetproofed Pt/silicate catalysts are comparable in overall performance to the best available wetproofed Pt/carbon catalyst when the catalysts are pro-rated on the basis of their platinum contents.

This level of catalytic performance of the silicalite based catalyst of the present invention is similar to that observed for isotopic exchange as shown in Table 5.

Other suitable high molecular weight, organic, polymeric materials may be used such as, for example, inherently hydrophobic copolymers such as, fluorinated ethylenepropolyne or partially fluorinated copolymers such as ethylene-chlorofluoroethylene or polyvinylidenefluoride.

TABLE 6

Comparison of Activity of Wetproofed Catalysts for Recombination of 1.1% $O_2$ with Hydrogen

| Catalyst | Size of Pellets (mm) | Platinum Support | Platinum Loading[a] (wt %) | Rate[b] Constant, $k_1$ $s^{-1}$ | Rate Constant/g (Pt) $s^{-1} \cdot g^{-1}$ (Pt) |
|---|---|---|---|---|---|
| P | 4.6 | Silicalite[c] | 0.13 | 4.1 | 31.5 |
| Q | 4.6 | Carbon | 0.15 | 5.1 | 34 |
| R | 6.1 | Carbon | 0.26 | 6.1 | 23.5 |

[a]Pt content of wetproofed catalysts determined by neutron activation
[b]Limiting value of rate constant for recombination measured for a hydrogen plus oxygen flow above 600 $cm^3(STP) \cdot s^{-1}$
[c]Pt/Silicalite prepared according to Procedure B-2.

We claim:

1. A method of manufacturing a crystalline silica/platinum catalyst structure comprising:
    (a) soaking a hydrophobic, porous, high surface area, crystalline silica ($SiO_2$) lattice essentially free of aluminum in the $SiO_2$ lattice, in an aqueous solution of $Pt(NH_3)_4 Cl_2$ with added volatile amine in an amount sufficient to bring the pH of said solution to at least 9.5; the crystalline silica being a silica polymorph consisting of crystalline silica which, after calcination in air at 600° C. for one hour, has a mean refractive index of 1.39±0.01 and a specific gravity at 25° C. of 1.70±0.05 g/cc, then
    (b) drying the soaked, hydrophobic, porous, high surface area, crystalline silica to leave catalyst crystallites of platinum from the aqueous solution of $Pt(NH_3)_4Cl_2$ on the crystalline silica and in the pores thereof, then
    (c) reducing the catalyst crystallites by heating them in an atmosphere of hydrogen gas, then
    (d) cooling the crystallites to room temperature in an inert atmosphere, then
    (e) coating the crystalline silica, with the catalyst crystallites thereon and in the pores thereof, with high molecular weight, organic polytetrafluoroethylene polymeric material to provide an outer, porous membrane coating thereon which is inherently hydrophobic, to substantially inhibit the passage of water therethrough, and which is water vapour and gas permeable so that water vapour may pass therethrough.

2. A method according to claim 1 wherein sufficient volatile amine is added to the aqueous solution to bring the pH thereof in the range of 10.5 to 11.0.

3. A method according to claim 1 wherein the volatile amine is selected from the group consisting of ammonia and methylamine.

4. A method according to claim 1, wherein the crystalline silica, with the catalyst crystallites on and in the pores thereof, is slurried with a fluid suspension of the high molecular weight, polytetrafluoroethylene organic, polymeric material, a ceramic support is coated with the slurry, and then the slurry coating is dried to leave a coating on the ceramic support comprising the crystalline silica, with the catalyst crystallites thereon and in the pores thereof, and coated with the high molecular weight, organic, polytetrafluoroethylene polymeric material.

* * * * *